US012082082B2

(12) United States Patent
Geissler et al.

(10) Patent No.: US 12,082,082 B2
(45) Date of Patent: Sep. 3, 2024

(54) VALIDATION AND TRAINING SERVICE FOR DYNAMIC ENVIRONMENT PERCEPTION BASED ON LOCAL HIGH CONFIDENCE INFORMATION

(71) Applicant: Intel Corporation, Santa Clara, CA (US)

(72) Inventors: Florian Geissler, Munich (DE); Ralf Graefe, Haar (DE); Michael Paulitsch, Ottobrunn (DE); Yang Peng, Munich (DE); Rafael Rosales, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 17/131,161

(22) Filed: Dec. 22, 2020

(65) Prior Publication Data

US 2021/0110170 A1    Apr. 15, 2021

(51) Int. Cl.
| | |
|---|---|
| *G06N 20/00* | (2019.01) |
| *G06F 18/21* | (2023.01) |
| *G06V 20/56* | (2022.01) |
| *G06V 20/58* | (2022.01) |
| *H04W 4/40* | (2018.01) |

(52) U.S. Cl.
CPC ............ *H04W 4/40* (2018.02); *G06F 18/217* (2023.01); *G06N 20/00* (2019.01); *G06V 20/56* (2022.01); *G06V 20/58* (2022.01)

(58) Field of Classification Search
CPC ........ H04W 4/40; H04W 4/025; H04W 4/38; G06F 18/217; G06F 18/25; G06N 20/00; G06N 5/046; G06V 20/56; G06V 20/58; G08G 1/0125; G08G 1/048; H04L 63/10; H04L 67/12

USPC .......................................................... 382/104
See application file for complete search history.

(56) References Cited

U.S. PATENT DOCUMENTS

| | | | |
|---|---|---|---|
| 2018/0300880 A1* | 10/2018 | Fan | G06V 20/582 |
| 2019/0012551 A1* | 1/2019 | Fung | G06F 18/24 |
| 2019/0051153 A1 | 2/2019 | Giurgiu et al. | |
| 2019/0258878 A1* | 8/2019 | Koivisto | G01S 7/417 |

(Continued)

FOREIGN PATENT DOCUMENTS

WO    2020205655    10/2020

OTHER PUBLICATIONS

"Vehicle Basic Safety Communication", https: local.iteris.com arc-it html functionalobjects funobj39.html, (2021), 3 pgs.

(Continued)

*Primary Examiner* — Ali Bayat
(74) *Attorney, Agent, or Firm* — Schwegman Lundberg & Woessner, P.A.

(57) ABSTRACT

Described herein is a high confidence ground truth information service executing on a network of edge computing devices. A variety of participating devices obtain high confidence ground truth information relating to objects in a local environment. This information is communicated to the ground truth information service, where it may be verified and aggregated with similar information before being communicated as part of an acquired ground truth dataset to one or more subscribing devices. The subscribing devices use the ground truth information, as included in the ground truth dataset, to both validate and improve their supervised learning systems.

25 Claims, 5 Drawing Sheets

(56) References Cited

U.S. PATENT DOCUMENTS

| | | |
|---|---|---|
| 2020/0245115 A1 | 7/2020 | Dorrance et al. |
| 2020/0293796 A1* | 9/2020 | Sajjadi Mohammadabadi ............ G06V 10/82 |
| 2021/0110170 A1* | 4/2021 | Geissler ................. G06N 5/046 |
| 2021/0150230 A1* | 5/2021 | Smolyanskiy ......... G06V 20/56 |
| 2021/0287018 A1* | 9/2021 | Yoo ........................ G06V 10/82 |
| 2023/0049567 A1* | 2/2023 | Popov ................... G01S 13/865 |

OTHER PUBLICATIONS

"Road Experience Management", Mobile Eye Intel, (2021), 7 pgs.
"Dedicated Short Range Communications (DSRC) Message Set Dictionary Resources", SAE International, 1 pg.
Yee, Ryan, "Collaborative Perception for Automated Vehicles Leveraging Vehicle-to-Vehicle Communications", 2018 IEEE Intelligent Vehicles Symposium (IV), (Jun. 2018), 8 pgs.
"European Application Serial No. 21209559.0, Extended European Search Report mailed May 20, 2022", 7 pgs.
"European Application Serial No. 21209559.0, Response filed Nov. 22, 2022 to Extended European Search Report mailed 05-20-2", 9 pgs.
"European Application Serial No. 21209559.0, Communication Pursuant to Article 94(3) EPC mailed Jun. 25, 2024", 5 pgs.

* cited by examiner

VALIDATION AND TRAINING SERVICE FOR DYNAMIC ENVIRONMENT PERCEPTION BASED ON LOCAL HIGH CONFIDENCE INFORMATION

TECHNICAL FIELD

The present application generally relates to a network-based information service for supporting a fleet of vehicles, and particularly, each vehicle's automated driver-assistance system (ADAS). More specifically, the present application involves an information service, provided by a set of networked edge computing devices, that obtains ground truth information from one or more devices in a local environment, and then distributes the ground truth information to a supervised learning system of a vehicle in the local environment, for use in validating the performance of the vehicle's ADAS.

BACKGROUND

A goal of an automated driver-assistance system (ADAS) is to safely automate the operation of a vehicle. Typically, safely automating the operation of a vehicle requires that the vehicle have a system that can, in real-time, accurately perceive and model its local environment in order to obtain an understanding of any dynamic and static objects within the local environment. By way of example, a vehicle must be able to recognize other vehicles, bicyclists, pedestrians, road signs, traffic signals, and so forth. This must be done under all conditions, while the vehicle is itself moving, and the state of each object within the environment is constantly changing. Many vehicle systems utilize advanced supervised machine learning techniques to generate a model of the environment. For instance, information from a variety of in-vehicle sensors is provided as input to a machine-learned environment modeling system. Based on the real-time information from the sensors, a model of the environment is generated. In this manner, the environment modeling system attempts to identify objects in the local environment and their relevant properties (e.g., location or position, speed, direction of travel, orientation, etc.). However, because objects are constantly changing and due to perturbances in the environment, accurately modeling the environment remains an extremely difficult challenge. As such, continuous validation and learning in the dynamically changing environment is of great importance in addressing these challenges.

One of the fundamental problems with any supervised machine learning technique involves establishing an accurate and reliable source of ground truth information. In this context, ground truth refers to a highly accurate dataset that represents the actual state of something in the real world—for example, a vehicle's actual speed, position, orientation, and so forth. An environment model established via perception mechanisms—for instance, such as with a supervised machine learning system—is almost certainly going to exhibit errors. However, without a ground truth dataset by which the performance of the system can be measured, it is difficult to identify when errors have occurred and to improve the system. More importantly, the safety of any action of the vehicle that may be dependent upon the output of the learning system may be compromised.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems for providing a ground truth information service that distributes acquired ground truth datasets to a vehicle for use in validating the performance of the vehicle's supervised learning system in modeling a local environment and the objects therein. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

In the realm of automated driver-assistance systems, the concept of collaborative perception involves techniques in which multiple participants (e.g., vehicles) operate to create a joint environmental perception. Generally, collaborative perception techniques rely on the direct communication of safety messages from one vehicle to another vehicle using a low latency delivery mechanism. Conventional uses of such vehicle-to-vehicle safety messages include safety applications such as, cooperative adaptive cruise control, speed harmonization, and hazard warning systems. Conventional vehicle-to-vehicle safety messages typically allow one vehicle to leverage the perception abilities of another vehicle. For instance, such messages are typically communicated between vehicles in order to allow for one vehicle to react to a safety message received from another vehicle, for example, by using information included with a safety message to model some object in the local environment, calculate a vehicle path, or generate a potential collision alert. However, conventional vehicle-to-vehicle messages do not facilitate any means or mechanisms by which a vehicle's supervised learning system can improve over time.

Consistent with embodiments of the present invention, a ground truth information service is comprised of a network of edge computing devices that receive high confidence ground truth information from participating devices, such as vehicles, mobile computing devices (e.g., mobile phones), and/or road-side sensors (e.g., speed detection devices, fixed cameras, etc.). The edge computing devices process the received information concerning various objects in the local environment, aggregate information relating to common objects, and in some instances, verify that the information can be relied upon as high confidence ground truth information. Then, the ground truth information service formats the information as a acquired ground truth dataset for consumption by the supervised learning system of one or more subscribing vehicles and distributes the ground truth information to the subscribing vehicles. A subscribing vehicle, upon receiving the acquired ground truth dataset, will utilize the information to validate the performance of its supervised learning system, and specifically, the ability of the learning system to accurately perceive and model objects in the local environment. In some instances, particularly when there is a discrepancy between some value relating to a property of an object as perceived by the learning system and as received via the ground truth information service, the learning system of the subscribing vehicle will utilize the acquired ground truth information to update its environment perception capabilities. Advantageously, this allows the learning system of the vehicle to improve over time. Other advantages of the various embodiments of the present invention will be readily apparent from the description of the various figures that follow.

Figure 1:
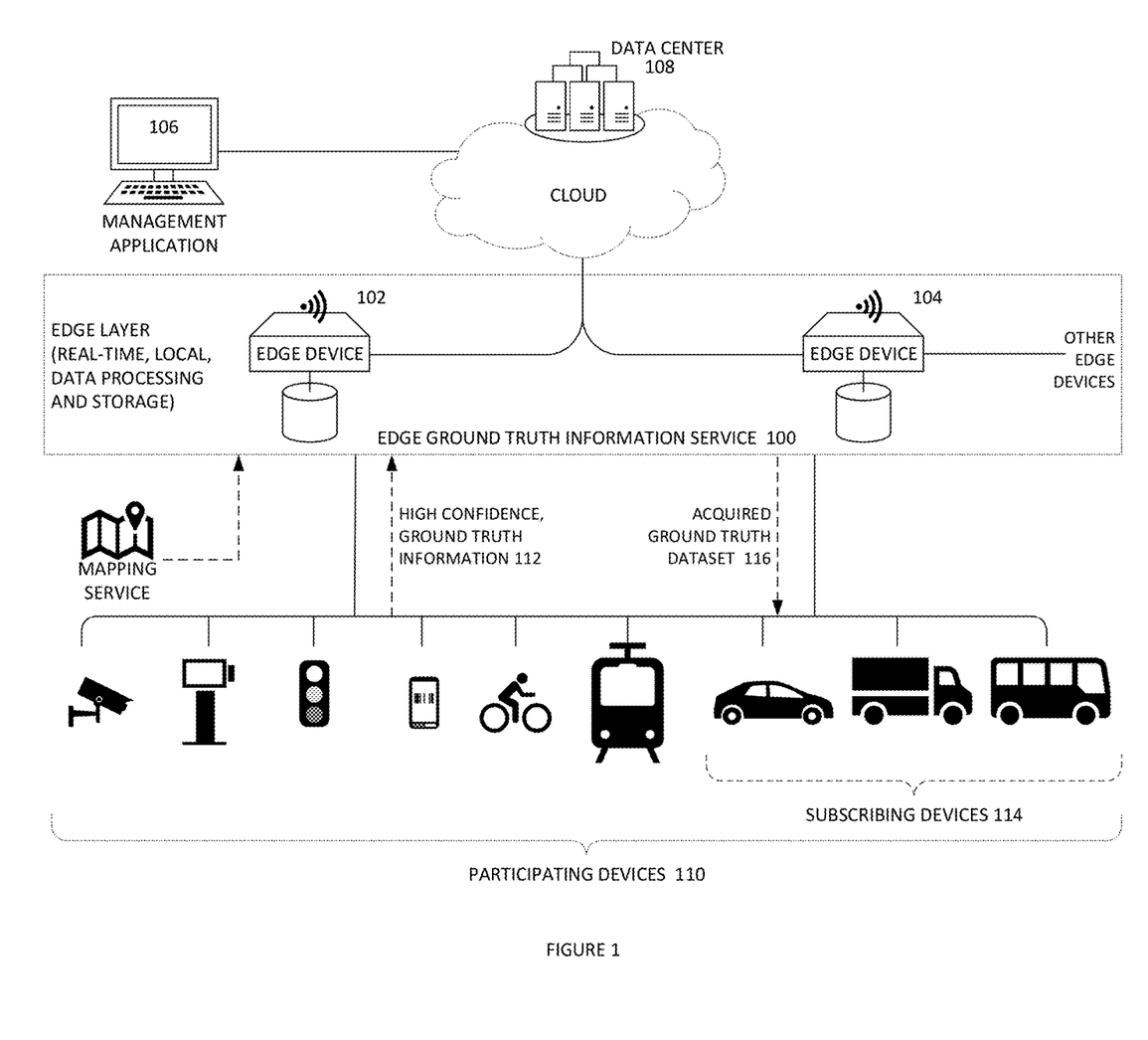
FIG. 1 is a system diagram illustrating an example of an overall system that includes a fleet of vehicles that leverage a ground truth information service to assess and validate their supervised learning system's performance in modeling a local environment, consistent with some embodiments of the present invention.

FIG. 1 is a system diagram illustrating an example of an overall system that includes a fleet of vehicles that leverage a ground truth information service 100 to assess and validate their supervised learning system's performance in modeling a local environment, consistent with some embodiments of the present invention. As illustrated in FIG. 1, the edge ground truth information service 100 is comprised of a network of edge computing devices 102 and 104, which can be accessed, configured and monitored over a communications network using a management application 106. The term "edge" in edge device is meant to convey that the devices are strategically located to bring their data processing and storage capabilities closer to the locations where it is needed, and to thereby improve response times and save bandwidth. Accordingly, as a primary purpose of each edge device 102 and 104 is to distribute acquired ground truth datasets to subscribing devices (e.g., vehicles), each edge device 102 and 104 will generally be located in places where vehicles travel, and in many instances, in high traffic areas. As illustrated in FIG. 1, each edge device 102 and 104 may be connected to a cloud-based data center 108. Accordingly, on some periodic basis, each edge device 102 and 104 may offload locally stored data to be further processed and stored at a data center 108.

Consistent with embodiments of the invention, each edge device 102 and 104 may receive high confidence ground truth information from a variety of participating devices 110. As used herein, a participating device 110 is essentially any device that has been both approved, and configured, to send high confidence ground truth information to the ground truth information service 100 that is facilitated by the edge nodes 102 and 104. Some participating devices are referred to herein as subscribing devices 112, or subscribers. Subscribing devices, which are typically but not necessarily vehicles, are devices that subscribe to receive acquired ground truth datasets 116 from the ground truth information service 100. Subscribing devices, such as vehicles, may also communicate high confidence ground truth information 112 to the ground truth information service 100. Accordingly, high confidence ground truth information 112 received from one subscribing vehicle may be communicated in an acquired ground truth dataset 116 to another subscribing vehicle.

As illustrated in FIG. 1, the participating devices 110 that generate ground truth information 112 vary significantly and may include a variety of different types of devices having different types of sensors for observing and measuring a variety of properties of objects in a local environment. Because the information being communicated to the ground truth information service is meant to be high confidence information, only certain devices are approved to participate and provide ground truth information. Furthermore, although beyond the scope of the present invention, all communications between devices of all types will be communicated using secure communication protocols to protect data privacy and ensure the safety of the overall system.

Consistent with some embodiments, high confidence ground truth information 112 will be communicated to the ground truth information service 100 from one or more vehicles in a fleet of subscribing vehicles 114. The exact nature of the high confidence information communicated from a vehicle to the ground truth information service 100 will ultimately depend upon the particular capabilities (e.g., number and type of sensors) included in the vehicle. In various embodiments, the ground truth information that is communicated from a vehicle to the ground truth information service 100 may be information relating to various dynamic properties that are obtained by one or more in-vehicle sensors of the vehicle. Such information may include but is not necessarily limited to: location or position, speed, direction of travel, rate of acceleration, orientation, and braking system status. In addition to the aforementioned dynamic properties, a vehicle may also communicate information concerning static properties of a vehicle. Such information may include, but again not necessarily be limited to: make and/or model of vehicle, type of vehicle (e.g., sedan, wagon, van, truck, etc.) size of vehicle, and color of vehicle. The dynamic and static properties are generally those that may be used by a supervised learning system of a vehicle when attempting to detect and model objects in a local environment, and/or predict the motion of objects in the local environment. With some embodiments, each vehicle may maintain a database of vehicle properties (e.g., static properties, such as make/model, dimensions, size, color, etc.), such that, when one vehicle receives a single identifying property (e.g., a vehicle identification number) relating to another vehicle, the database can be used to look-up and obtain a complete listing of properties for a vehicle. This reduces the amount of information that must be communicated between the devices.

In addition to vehicles, a variety of other participating devices 110 may provide high confidence ground truth information 112 to the ground truth information service 100. In many instances, the ground truth information relating to a particular object in the local environment will be information that is obtained by a sensor, or combination of sensors, that are component parts of the participating device itself. For example, a mobile computing device (e.g., mobile phone), a smart bike, and/or a streetcar, may all have a built-in navigation system by which certain properties can be obtained and shared with the ground truth information service 100. For instance, a navigation system may acquire precise location and movement information from any one of various global navigation satellite systems (GNSS). Similarly, a traffic signal may communicate information about the timing of signal changes—for example, the precise time at which the signal changed from one color to another. Accordingly, each of these participating devices may share ground truth information about itself, as an object in the local environment.

However, in other instances, one or more participating devices 110 may have one or more sensors and/or internal sensing systems for making observations about other objects in the local environment. By way of example, a speed detection device may use radar to generate high confidence information about the speed and/or direction of travel of vehicles, bicyclists, and/or pedestrians in the local environment. Similarly, a fixed camera may be strategically positioned within a local environment to detect properties of objects in that environment. As such, some participating devices will communicate high confidence ground truth information concerning objects observed in the local environment.

Figure 2:
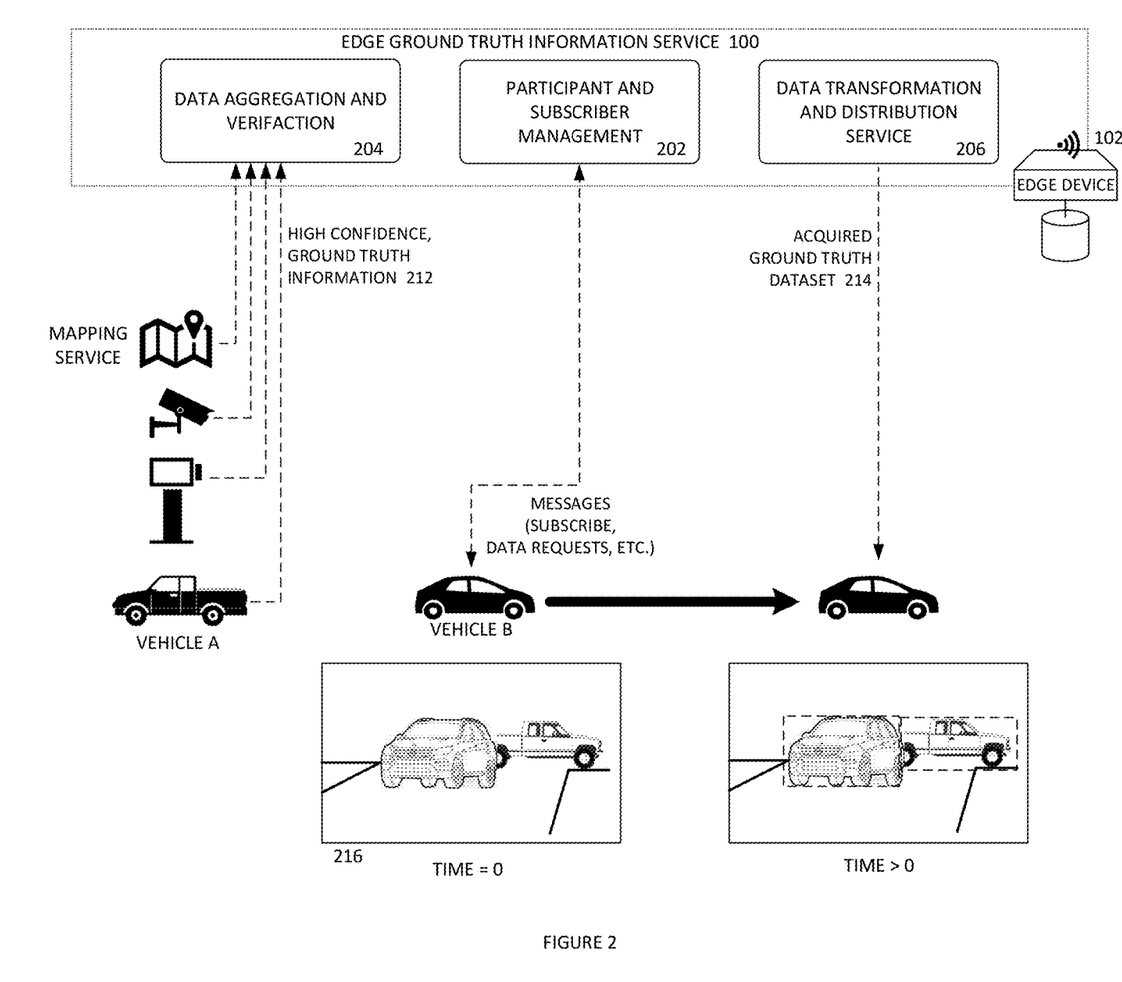
FIG. 2 is a system diagram illustrating an example of how various devices may contribute high confidence ground truth information to a ground truth information service, and how a subscribing vehicle may utilize such information, consistent with some embodiments of the invention.

FIG. 2 is a system diagram illustrating an example of how various devices may contribute high confidence ground truth information 212 to a ground truth information service 100, and how a subscribing vehicle may utilize such information, consistent with some embodiments of the invention. As shown in FIG. 2, an edge device 102 is comprised of three primary functional components. First, the edge device 102 has what is referred to herein as a participant and subscriber management component 202, hereinafter, a management component 202. The management component 202 manages the process—including any messaging—by which participating and subscribing devices initially register with the information service, whether it be as a participating device that provides ground truth information, or a subscribing device that receives acquired ground truth datasets. Accordingly, the management module 202 may maintain a database of authorized devices and their capabilities, and in some instances, a list of trusted devices. As the ground truth information service consists of a group of connected edge devices, the management component 202 may communicate certain information to other edge computing devices, and/or a centralized, cloud-based server or data center.

Referring again to the edge device 102 of FIG. 2, a second functional component of the edge device 102 is a data aggregation and verification component 204. This component is generally responsible for receiving and processing the high confidence ground truth information 212 from the various participating devices in the local environment. In general, the data aggregation and verification component 204 will aggregate information as received from different devices, but relating to the same object in the local environment. By way of example, if a speed detector communicates the speed of a vehicle to the ground truth information service 100, and a fixed camera communicates other properties of the same vehicle, the data aggregation component 204 will aggregate the observed values for all of the different properties of the vehicle.

In addition to aggregating information relating to the same object(s), etc., the data aggregation and verification component 204 may play a role in verifying that any received ground truth information satisfies a confidence threshold requirement. This may occur in one of several ways. First, with some embodiments, certain participating devices may communicate confidence level information with ground truth information. For example, in some scenarios, some sensors may have the ability to establish or derive a measure of error with respect to some observed measurement obtained by the sensor. Accordingly, at least in some scenarios with some embodiments, a confidence level may be associated with any observed value of a property of an object that is communicated as ground truth information to the ground truth information service 100. In other instances, and with some embodiments, certain devices and/or certain sensors may be deemed reliable by default—that is, as a human judgment about how those devices operate—such that, high confidence ground truth information reported to the ground truth information service 100 from these devices and/or sensors are generally deemed to satisfy the confidence threshold requirement by virtue of simply confirming the source from which the information was received. Accordingly, the verification component 204 may use a device identifier received with the ground truth information to ascertain whether the device reporting the information is on a list of known and trusted devices. Alternatively, some information identifying the type of device, and/or the type of sensor or combination of sensors used to derive the ground truth information may be indicated with meta-data received with the ground truth information, and may serve as a source of information for verifying that ground truth information satisfies a confidence threshold requirement.

With some embodiments, determining whether some ground truth information satisfies a confidence threshold requirement may involve applying a rule-based algorithm to some combination of ground truth information received by the service. For example, after aggregating ground truth information so that all information relating to the same object is stored together, it may be the case that more than one value exists for a particular property of an object—e.g., the speed of a vehicle. For instance, the speed of a vehicle may be reported as ground truth information by the vehicle itself, but also by a speed detector. If a plurality of observed values are nearly the same, for example, such that no one value deviates from some measure of central tendency (e.g., the average of the values), then the system may conclude that one of the values, or perhaps a measure of central tendency for the values, satisfies the confidence threshold requirement, and can thus be used as high confidence ground truth information in an acquired ground truth dataset. Accordingly, the data aggregation and verification component 204 will identify any ground truth information that does not satisfy the confidence threshold requirement and filter out such information to ensure that it is not included in any acquired ground truth dataset used to validate the performance of a vehicle's learning system.

Finally, the third component of an edge device 102 is a data transformation and distribution service 206. This service 206 operates to transform any data from a source format, perhaps as received from a participating device, into a format that is appropriate and suitable for use within an acquired ground truth dataset by a subscribing vehicle. For example, the data transformation and distribution service 206 may convert or transform certain location or position information into information that is expressed in a coordinate system used by a subscriber (e.g., a vehicle). Once all values for properties of an object have been properly transformed, the data transformation and distribution service 206 will select and format data for use as an acquired ground truth dataset. Consistent with some embodiments, after a vehicle communicates one or more initial messages to the management component 202 to establish authorization and to subscribe to the ground truth information service 100, the vehicle may periodically "ping" the distribution service 206 to indicate its presence generally, and its location specifically. Using the information concerning the location of a subscribing vehicle, the ground truth information service 100 can make decisions as to when, and what, acquired ground truth datasets are to be communicated to the vehicle.

Referring to FIG. 2 and by way of example, a first vehicle—Vehicle A—may obtain from its in-vehicle global positioning system (GPS) its exact position, speed, and direction of travel. In this instance, the position, speed, and direction of travel are considered properties of Vehicle A—an object in the local environment. Moreover, as the information is obtained from a highly reliable sensing mechanism—for example, the in-vehicle GPS device—the information is considered to be high confidence information. Vehicle A may communicate this information 212 wirelessly to an edge computing device 102 facilitating a ground truth information service 100. Upon receiving the ground truth information 212 from Vehicle A, the data aggregation and verification component 204 of the edge computing device 102 may verify that the information satisfies a confidence threshold requirement. As described above, this may be done by simply confirming that Vehicle A is included within a list of known trusted devices maintained at the edge computing device 102. Once the information received from Vehicle A has been verified—that is, the information has satisfied the confidence threshold requirement—the data transformation and distribution service 206 of the edge computing device 102 processes the information to derive an acquired ground truth dataset 214. For example, this may involve aggregating the information received from Vehicle A with other information about Vehicle A, as received from one or more other devices, as well as other information about the local environment, including information from a mapping service. Furthermore, the information is formatted in a manner that is suitable for use as an acquired ground truth dataset 214 by a subscribing vehicle's supervised learning system.

Continuing with the example, a second vehicle—Vehicle B—has previously subscribed to the ground truth information service 100. As Vehicle B travels in the local environment, one or more in-vehicle sensors (e.g., an image sensor) of Vehicle B observes Vehicle A travelling in the local environment, as shown in the image with reference number 216. The supervised learning system of Vehicle B, in deriving an environment model for the local environment, includes within the model information about the observed object—Vehicle A—and several of its properties, including the position, speed, and direction of travel of Vehicle A. As a subscriber to the ground truth information service, Vehicle B will periodically communicate a message to the nearest edge computing device to indicate its presence and, in some instances, request acquired ground truth datasets. Accordingly, the ground truth information service 100 will communicate the aforementioned ground truth dataset 214 to Vehicle B for use in validating the environment model derived by the supervised learning system of Vehicle B, and specifically, the model information relating to Vehicle A, as derived using the information obtained from the in-vehicle sensors of Vehicle B. Accordingly, as shown in the image with reference number 218, at some time (TIME>0) subsequent to when vehicle B made an observation about one or more properties of Vehicle A (e.g., at TIME=0), the environment modeling algorithm of Vehicle B receives the acquired ground truth dataset 214, which includes information about one or more properties of Vehicle B at time (TIME=0). Accordingly, Vehicle B can use the information in the acquired ground truth dataset to assess how well the environment modeling algorithm of Vehicle B performed in determining properties of Vehicle A. To the extent that there are any discrepancies in the data, some portion of the acquired ground truth dataset may be used to update or revise the behavior of the learning system. Accordingly, this will improve the performance of the learning system of Vehicle B.

Figure 3:
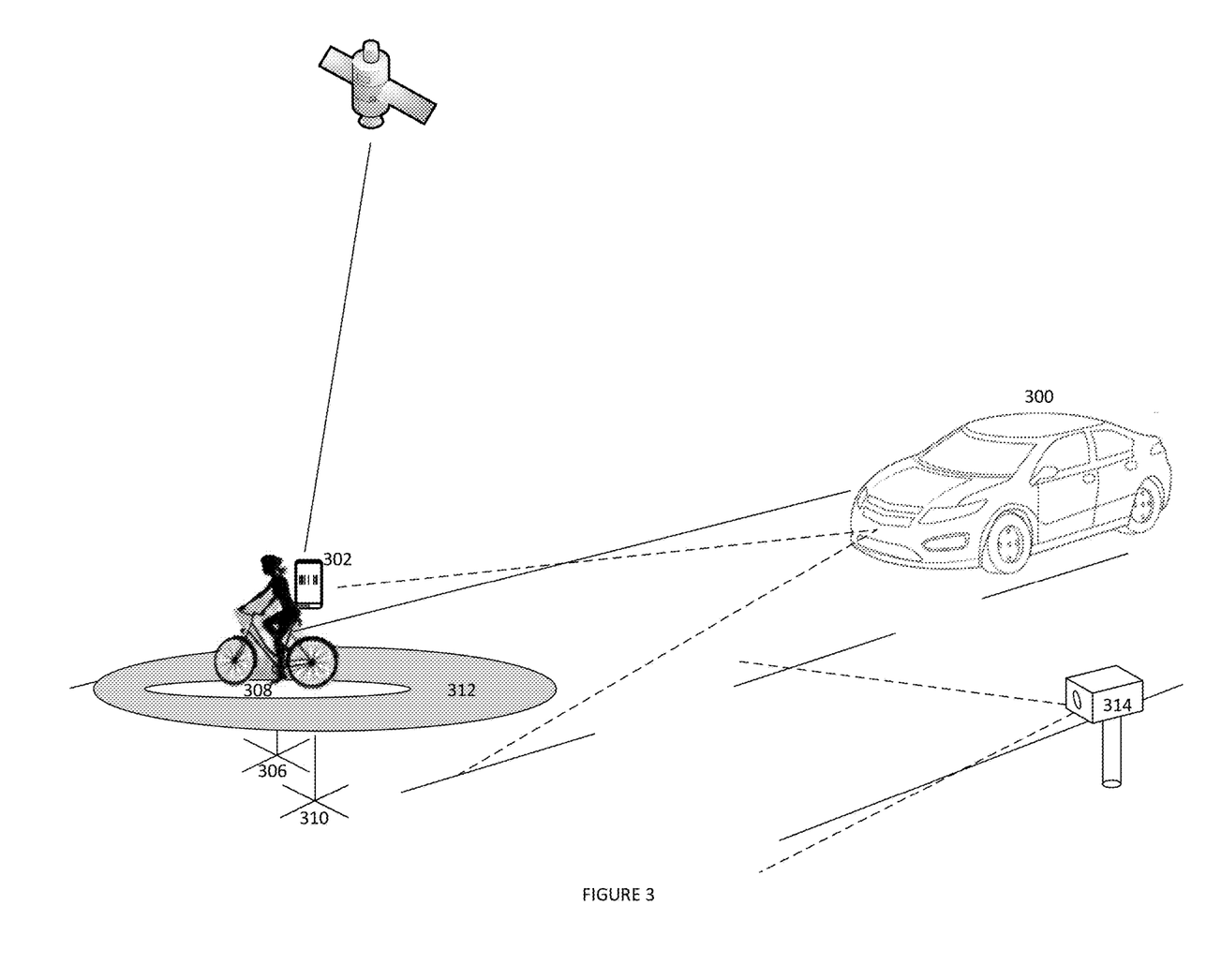
FIG. 3 is a diagram illustrating a specific example of a vehicle leveraging ground truth information generated via a mobile computing device (e.g., mobile phone) carried by a bicyclist, consistent with embodiments of the invention.

FIG. 3 is a diagram illustrating a specific example of a vehicle 300 leveraging ground truth information generated via a mobile computing device (e.g., mobile phone 302) carried by a bicyclist, consistent with embodiments of the invention. In the example of FIG. 3, a subscribing vehicle 300 is traveling a road. On the side of the road, a bicyclist, who is carrying a mobile phone 302, is riding. The mobile phone 302 may be executing an application that uploads ground truth information to the ground truth information service. Because the mobile phone 302 is equipped with a Global Positioning System (GPS) receiver, the mobile phone 302 is able to generate extremely accurate, high confidence information about the position of the bicyclist, which is indicated in FIG. 3 by the position indicator with reference number 306. The inner circle with reference number 308 is provided here to illustrate the confidence level of the measurement for the position, as derived by the mobile phone 302. As such, the circle with reference number 308 is relatively small to indicate the likely small error margin associated with the position information as generated by the GPS of the mobile phone 302.

The vehicle 300, which may be equipped with a variety of sensors (e.g., cameras, lidar, radar), uses the sensor information in combination with a supervised machine learning algorithm (e.g., a neural network) to derive position information for the bicyclist. The position of the bicyclist, as derived by the vehicle, is indicated by the position indicated with reference number 310. The larger circle with reference number 312 indicates the typical error margin of the estimated position as derived by the vehicle's supervised learning system.

The position information 306 of the bicyclist, as generated by the mobile phone 302, is communicated to the ground truth information service, which in turn, distributes the position information within an acquired ground truth dataset to the vehicle 300. Accordingly, the vehicle 300 can use the position of the bicyclist, as derived by the mobile phone 302, to both validate the performance of its ability to derive the position information using its supervised learning system, and then use the high confidence position information to adjust the parameters impacting the perception capabilities over time, thus improving the accuracy with which the system may estimate the position of a subsequently encountered bicyclist or pedestrian.

As illustrated in FIG. 3, road-side camera 314 may also generate position information for the bicyclist. Consistent with some embodiments, a fixed position camera or image sensor, such as that with reference number 314, may operate in combination with another sensing device (e.g., a radar or lidar) to generate position information, and other properties of objects in the environment. Accordingly, with some embodiments, the road-side camera 314 may provide ground truth information to the ground truth information service. In addition, with some embodiments, the road-side camera may subscribe to the ground truth information so that it can receive high confidence ground truth information from other participants, and use that information to fine tune its own perception capabilities over time, in much the same way as the vehicle.

Figure 4:
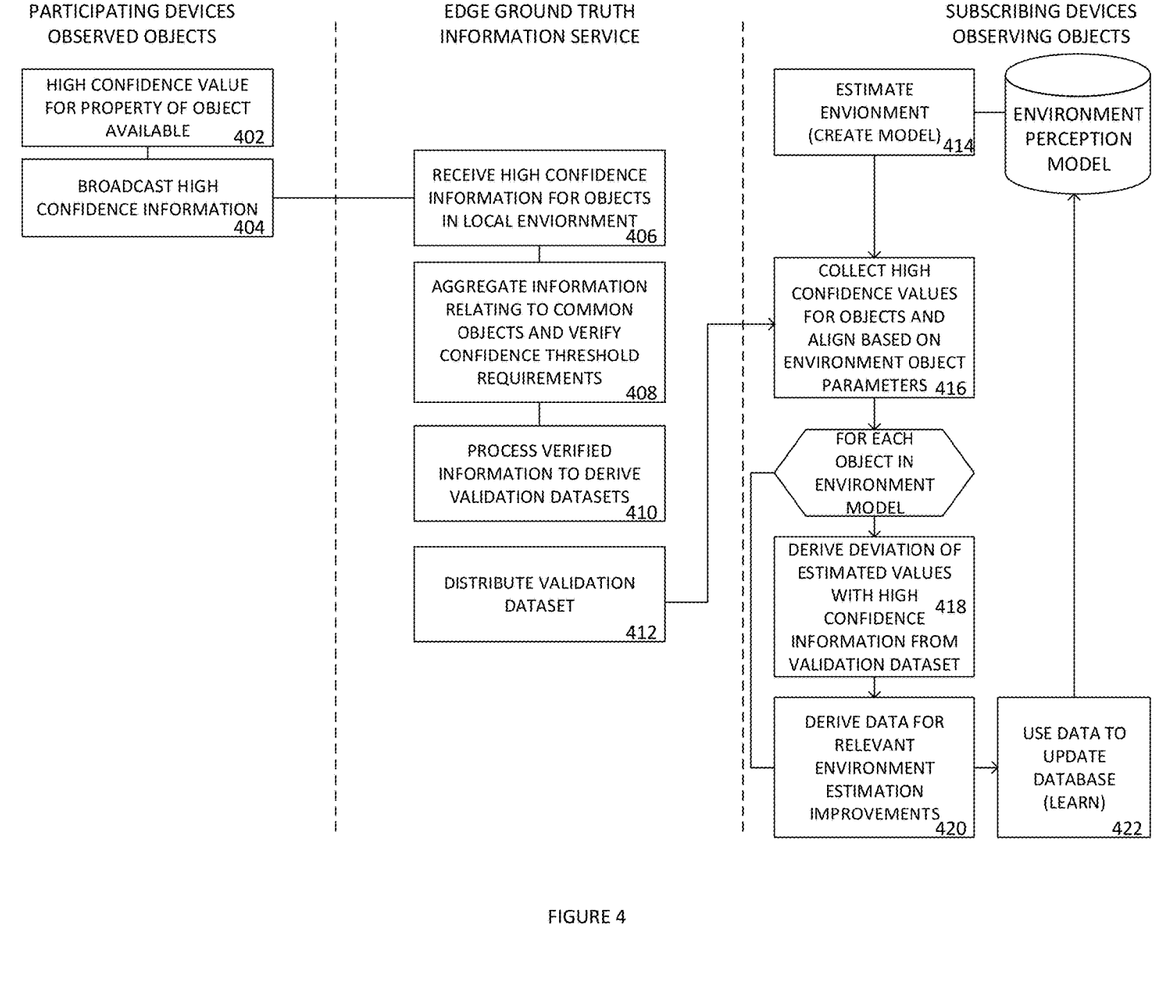
FIG. 4 is a flow diagram illustrating various operations that are performed in providing a ground truth service, consistent with embodiments of the invention.

FIG. 4 is a flow diagram illustrating various operations that are performed in providing a ground truth information service, consistent with embodiments of the invention. As illustrated in FIG. 4, at operation 402, one or more participating devices determines that a high confidence value for a property of an object is available to share with a ground truth information service. The object may be the participating device itself, as in the case of a vehicle that might share information about itself. Alternatively, the participating device may use one or more sensors to observe a property of an object in the local environment. At operation 404, the high confidence ground truth information is broadcast or communicated to the ground truth information service.

At operation 406, the ground truth operation service—specifically, an edge computing device—receives the high confidence ground truth information from the participating device. Next, at operation 408, the ground truth information service aggregates the received information with other information that relates to the same object. Additionally, the ground truth information service may verify that any received ground truth information satisfies a confidence threshold requirement. At operation 410, the verified ground truth information is processed to derive an acquired ground truth dataset for use by one or more subscribing vehicles in the local environment. Finally, at operation 412, an acquired ground truth dataset is communicated to a subscribing device, such as a vehicle, in the local environment.

At operation 414, a supervised learning system of the subscribing device executes a series of instructions to generate an estimate of the environment, which includes information about various objects in the environment. At operation 416, the supervised learning system obtains the high confidence values for objects in the environment from the acquired ground truth dataset, and aligns the obtained values with corresponding values from the perceived object parameters. Next, for one or more objects in the environment model, at operation 418, the learning system derives a deviation of estimated values, as determined by the supervised learning system, with obtained high confidence information from the acquired ground truth dataset. At method operation 420, the learning system derives data for relevant environment estimation improvements. Finally, the improvement data is used to update the environment perception model data in the database used to estimate the environment, at operation 422, thereby resulting in improved estimations going forward.

Figure 5:
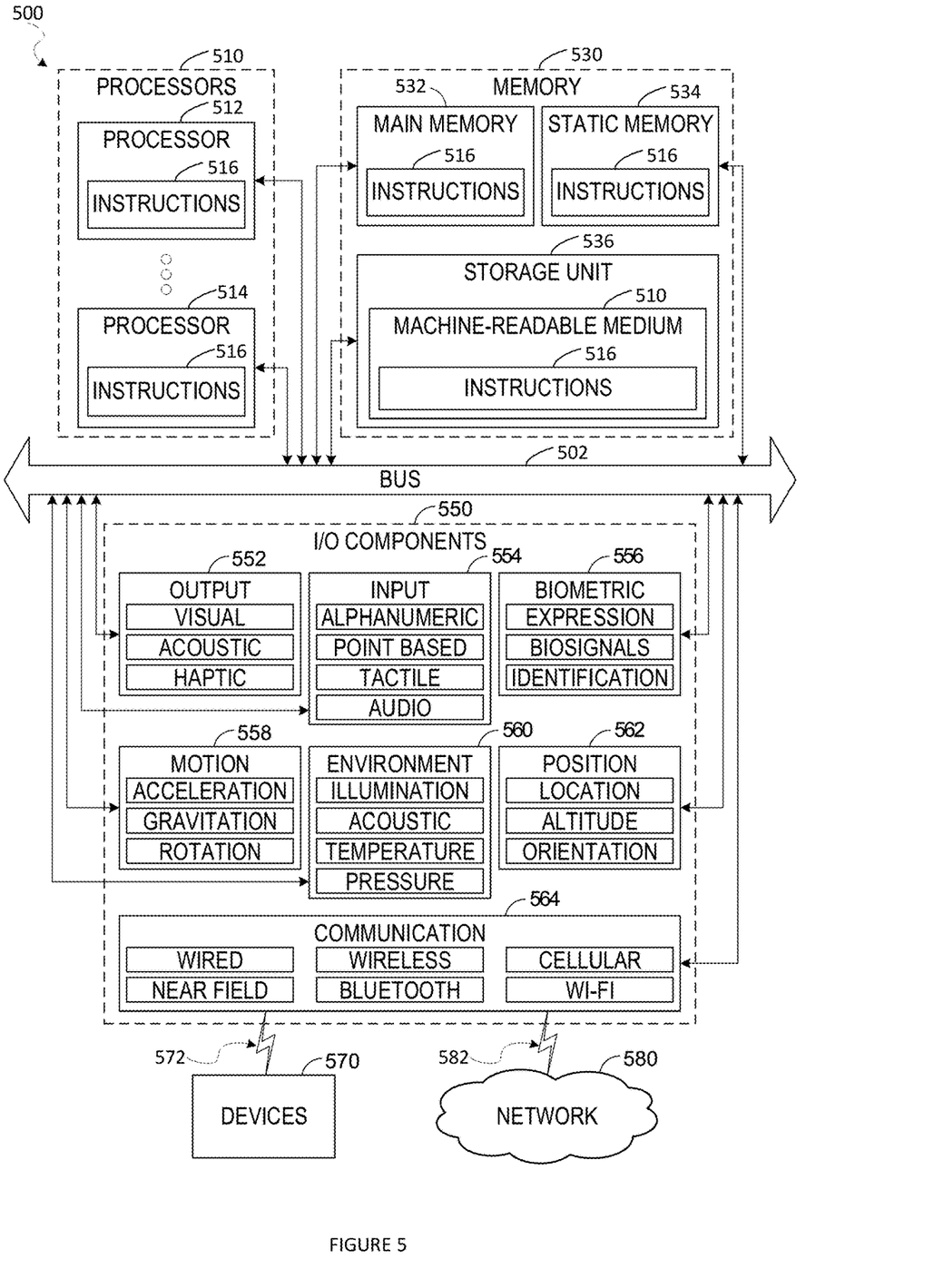
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions 516 may cause the machine 500 to execute any one of the method operations described in connection with FIG. 4. Additionally, or alternatively, the instructions 516 may implement the devices and/or systems described in connection with FIGS. 1, 2 and 3, and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory 530 may include a main memory 532, a static memory 534, and a storage unit 536, all accessible to the processors 510 such as via the bus 502. The main memory 530, the static memory 534, and storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 530, 532, 534, and/or memory of the processor(s) 510) and/or storage unit 536 may store one or more sets of instructions and data structures (e.g., software) embodying or utilized by any one or more of the methodologies or functions described herein. These instructions (e.g., the instructions 516), when executed by processor(s) 510, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Example Embodiments

In one example embodiment, a ground truth information service is comprised of one or more networked edge computing nodes. The edge computing nodes comprise a wireless communication device for receiving and sending data, a data storage device for storing data, one or more processors for executing instructions, and a memory device storing instructions thereon. When the one or more processors execute the instructions stored in the memory device, an individual edge computing node performs a series of operations. The operations include receiving, via the wireless communication device, data from a plurality of devices in a local environment, wherein the data received from each device includes information identifying an object in the local environment and indicating a value for a property of the object. Additionally, for each value for a property of an object received, an operation is performed to verify that the value satisfies a confidence threshold requirement. Additionally, the edge computing node communicates an acquired ground truth dataset to the vehicle, wherein the acquired ground truth dataset includes at least one instance of a verified value for a property of an object in the local environment of the vehicle. By virtue of receiving the acquired ground truth dataset, the vehicle enabled to validate a value derived for the property of the object by the supervised learning system of the vehicle.

In one example embodiment, the edge computing device verifies that a value (e.g., of a property of an object) satisfies a confidence threshold requirement. This may be done by the edge computing device confirming that meta-data, as received with the information indicating the value for the property of the object, indicates a source of information that is a trusted source of information.

In one example embodiment, the edge computing device verifies that a value (e.g., of a property of an object) satisfies a confidence threshold requirement by confirming that a confidence level, as received with the information indicating the value for the property of the object, exceeds a confidence threshold for the type of property of the object, the type of device from which the information was received, and/or the type of sensor from which the value of the property was derived.

In one example embodiment, the edge computing device aggregates information received from different devices when the information relates to the same object in the local environment. The edge computing device verifies that each value for a property of the same object does not deviate from another value for the same property or an average of all values for the same property by more than some threshold.

In one example embodiment, the edge computing device receives information from a vehicle. The information identifies the vehicle as the object in the local environment, and includes at least one value for a property of the vehicle, which has been derived by one or more sensors of the vehicle and indicates one of: speed of the vehicle; direction of travel of the vehicle; position of the vehicle; or, orientation of the vehicle.

In one example embodiment, the edge computing device receives information from a stationary device that includes one or more sensors for deriving values for at least one property of an object in the local environment.

In one example embodiment, the edge computing device derives the acquired ground truth dataset by aggregating all verified values for all properties of an object in the local environment, and then communicates the acquired ground truth dataset to the vehicle subsequent to receiving a request for an acquired ground truth dataset from the vehicle.

In one example embodiment, the edge computing device derives the acquired ground truth dataset by aggregating all verified values for all properties of an object in the local environment, and then communicates the acquired ground truth dataset to the vehicle asynchronously, subsequent to having received a request, from the vehicle, to subscribe to receive acquired ground truth datasets.

What is claimed is:

1. An edge computing device comprising:
    a wireless communication device for receiving and sending data;
    a data storage device for storing data;
    one or more processors for executing instructions;
    a memory device storing instructions thereon, which, when executed by the processor, cause the edge computing device to perform operations comprising:
    receiving, via the wireless communication device, data from a plurality of devices in the local environment, the data received from each device including information identifying an object in the local environment and indicating a value for a property of the object;
    for each value for a property of an object received, verifying the value satisfies a confidence threshold requirement; and
    communicating an acquired ground truth dataset to a vehicle via the wireless communication device, wherein the acquired ground truth dataset includes at least one instance of a verified value for a property of an object in the local environment of the vehicle.

2. The edge computing device of claim 1, where verifying the value satisfies a confidence threshold requirement includes confirming that meta-data, as received with the information indicating the value for the property of the object, indicates a source of information that is a trusted source of information.

3. The edge computing device of claim 1, wherein verifying the value satisfies a confidence threshold requirement includes confirming that a confidence level, as received with the information indicating the value for the property of the object, exceeds a confidence threshold for the type of property of the object, the type of device from which the information was received, or the type of sensor from which the value of the property was derived.

4. The edge computing device of claim 1, further comprising:
aggregating information, received from different devices in the plurality of devices, relating to the same object in the local environment;
wherein verifying information indicating the value satisfies a confidence threshold requirement includes verifying that each value for a property of the same object, or an average of all values for the same property of the object deviates by less than a threshold.

5. The edge computing device of claim 1, wherein a device in the plurality of devices from which data is received is a vehicle, the information identifying the object in the local environment identifies the vehicle, and the value for the property of the vehicle is a value derived by one or more sensors of the vehicle and indicates one of: speed of the vehicle; direction of travel of the vehicle; position of the vehicle; or, orientation of the vehicle.

6. The edge computing device of claim 1, wherein a device in the plurality of devices from which data is received is a stationary device that includes one or more sensors for deriving values for at least one property of an object in the local environment.

7. The edge computing device of claim 1, further comprising:
deriving the acquired ground truth dataset by aggregating all verified values for all properties of an object in the local environment; and
wherein communicating the acquired ground truth dataset to the vehicle includes communicating the acquired ground truth dataset to the vehicle subsequent to receiving a request for an acquired ground truth dataset from the vehicle.

8. The edge computing device of claim 1, further comprising:
deriving the acquired ground truth dataset by aggregating all verified values for all properties of an object in the local environment; and
wherein communicating the acquired ground truth dataset to the vehicle includes communicating the acquired ground truth dataset to the vehicle subsequent to having received a request, from the vehicle, to subscribe to receive acquired ground truth datasets.

9. The edge computing device of claim 1, wherein the acquired ground truth dataset communicated to the vehicle via the wireless communication device enables the vehicle to validate a value derived for the property of the object by a supervised learning system of the vehicle.

10. A non-transitory computer-readable storage medium storing instructions, which, when executed by a processor of an edge computing device, cause the edge computing device to:
receive, via a network, data from a plurality of devices in a local environment, the data received from each device including information identifying an object in the local environment and indicating a value for a property of the object;
for each value for a property of an object received, verify the value satisfies a confidence threshold requirement; and
communicate, via the network, an acquired ground truth dataset to a vehicle, the acquired ground truth dataset including at least one instance of a verified value for a property of an object in the local environment of the vehicle.

11. The non-transitory computer-readable storage medium of claim 10, storing additional instructions, which, when executed by the processor of the edge computing device, cause the edge computing device to:
verify the value satisfies a confidence threshold requirement by confirming that meta-data, as received with the information indicating the value for the property of the object, indicates a source of information that is a trusted source of information.

12. The non-transitory computer-readable storage medium of claim 10, storing additional instructions, which, when executed by the processor of the edge computing device, cause the edge computing device to:
verify the value satisfies a confidence threshold requirement by confirming that a confidence level, as received with the information indicating the value for the property of the object, exceeds a confidence threshold for the type of property of the object, the type of device from which the information was received, or the type of sensor from which the value of the property was derived.

13. The non-transitory computer-readable storage medium of claim 10, storing additional instructions, which, when executed by the processor of the edge computing to:
aggregate information, received from different devices in the plurality of devices, relating to the same object in the local environment; and
verify information indicating the value satisfies a confidence threshold requirement by verifying that each value for a property of the same object, or an average of all values for the same property of the object deviates by less than a threshold.

14. The non-transitory computer-readable storage medium of claim 10, wherein a device in the plurality of devices from which data is received is a vehicle, the information identifying the object in the local environment identifies the vehicle, and the value for the property of the vehicle is a value derived by one or more sensors of the vehicle and indicates one of: speed of the vehicle; direction of travel of the vehicle; position of the vehicle; or, orientation of the vehicle.

15. The non-transitory computer-readable storage medium of claim 10, wherein a device in the plurality of devices from which data is received is a stationary device that includes one or more sensors for deriving values for at least one property of an object in the local environment.

16. The non-transitory computer-readable storage medium of claim 10, storing additional instructions, which, when executed by the processor of the edge computing to:
derive the acquired ground truth dataset by aggregating all verified values for all properties of an object in the local environment; and
communicate the acquired ground truth dataset to the vehicle responsive to receiving a request for an acquired ground truth dataset from the vehicle.

17. The non-transitory computer-readable storage medium of claim 10, storing additional instructions, which, when executed by the processor of the edge computing to:

derive the acquired ground truth dataset by aggregating all verified values for all properties of an object in the local environment; and communicate the acquired ground truth dataset to the vehicle subsequent to receiving from the vehicle a request to subscribe to receive acquired ground truth datasets.

18. The non-transitory computer-readable storage medium of claim 10, wherein the acquired ground truth dataset communicated to the vehicle enables the vehicle to validate a value derived for the property of the object by a supervised learning system of the vehicle.

19. An apparatus comprising:
means for receiving data from a plurality of devices in a local environment, the data received from each device including information identifying an object in the local environment and indicating a value for a property of the object;
means for verifying the value satisfies a confidence threshold requirement, for each value for a property of an object received; and
means for communicating an acquired ground truth dataset to a vehicle, the acquired ground truth dataset including at least one instance of a verified value for a property of an object in the local environment of the vehicle, and enabling the vehicle to validate a value derived for the property of the object by a supervised learning system of the vehicle.

20. The apparatus of claim 19, wherein said means for verifying the value verifies the value by confirming that meta-data, as received with the information indicating the value for the property of the object, indicates a source of information that is a trusted source of information.

21. The apparatus of claim 19, wherein said means for verifying the value verifies the value by confirming that a confidence level, as received with the information indicating the value for the property of the object, exceeds a confidence threshold for the type of property of the object, the type of device from which the information was received, and/or the type of sensor from which the value of the property was derived.

22. The apparatus of claim 19, wherein said means for verifying the value verifies the value by confirming that a confidence level, as received with the information indicating the value for the property of the object, exceeds a confidence threshold for the type of property of the object, the type of device from which the information was received, and/or the type of sensor from which the value of the property was derived.

23. The apparatus of claim 19, wherein a device in the plurality of devices from which data is received is a vehicle, the information identifying the object in the local environment identifies the vehicle, and the value for the property of the vehicle is a value derived by one or more sensors of the vehicle and indicates one of: speed of the vehicle; direction of travel of the vehicle; position of the vehicle; or, orientation of the vehicle.

24. The apparatus of claim 19, wherein a device in the plurality of devices from which data is received is a stationary device that includes one or more sensors for deriving values for at least one property of an object in the local environment.

25. The apparatus of claim 19, further comprising:
means for deriving the acquired ground truth dataset by aggregating all verified values for all properties of an object in the local environment; and
means for communicating the acquired ground truth dataset to the vehicle subsequent to receiving a request for an acquired ground truth dataset from the vehicle.

* * * * *